(12) United States Patent
Soualle et al.

(10) Patent No.: US 10,250,291 B2
(45) Date of Patent: Apr. 2, 2019

(54) NOISE DISTRIBUTION SHAPING FOR SIGNALS, PARTICULARLY CDMA SIGNALS

(71) Applicant: Airbus DS GmbH, Taufkirchen (DE)

(72) Inventors: Francis Soualle, Munich (DE); Mathieu Cattenoz, Gentilly (FR)

(73) Assignee: AIRBUS DS GMBH, Taufkirchen (DE)

( * ) Notice: Subject to any disclaimer, the term of this patent is extended or adjusted under 35 U.S.C. 154(b) by 240 days.

(21) Appl. No.: 14/738,250

(22) Filed: Jun. 12, 2015

(65) Prior Publication Data

US 2015/0365130 A1    Dec. 17, 2015

(30) Foreign Application Priority Data

Jun. 13, 2014   (EP) ..................... 14290171

(51) Int. Cl.
*H04W 4/00*       (2018.01)
*H04B 1/7107*     (2011.01)
*H04B 1/10*       (2006.01)
*H04B 1/7097*     (2011.01)
*H04B 15/00*      (2006.01)
*H04J 13/00*      (2011.01)

(52) U.S. Cl.
CPC ............ *H04B 1/7107* (2013.01); *H04B 1/10* (2013.01); *H04B 1/7097* (2013.01); *H04B 15/00* (2013.01); *H04J 13/0003* (2013.01); *H04B 2201/70715* (2013.01)

(58) Field of Classification Search
None
See application file for complete search history.

(56) References Cited

U.S. PATENT DOCUMENTS

| 7,260,163 | B2 | 8/2007 | Li et al. | |
| 2004/0210789 | A1* | 10/2004 | Kusunoki | ............ H03F 1/3252 |
| | | | | 713/400 |
| 2004/0239559 | A1 | 12/2004 | King et al. | |
| 2008/0291982 | A1 | 11/2008 | Kirby et al. | |
| 2013/0148763 | A1 | 6/2013 | Gunawardena et al. | |
| 2013/0293421 | A1* | 11/2013 | Bartone | ................. G01S 1/042 |
| | | | | 342/386 |

OTHER PUBLICATIONS

European Search Report dated Nov. 28, 2014 (seven pages).

* cited by examiner

*Primary Examiner* — Zewdu A Beyen
(74) *Attorney, Agent, or Firm* — Crowell & Moring LLP

(57) ABSTRACT

A method is provided for noise distribution shaping of signals, particularly for the application in receivers for CDMA signals. The method includes the acts of generating a blanking control signal by comparing a received signal with at least one blanking threshold, adapting the at least one blanking threshold or the received signal according to an offset value depending on the amplitude of the received signal, and modifying the noise distribution of the received signal by applying blanking of the received signal under control of the blanking control signal.

16 Claims, 3 Drawing Sheets

NOISE DISTRIBUTION SHAPING FOR SIGNALS, PARTICULARLY CDMA SIGNALS

CROSS REFERENCE TO RELATED APPLICATION

This application claims priority under 35 U.S.C. § 119 from European Patent Application No. 14 290 171.9-1852, filed Jun. 13, 2014, the entire disclosure of which is herein expressly incorporated by reference.

TECHNICAL FIELD

The invention relates to noise distribution shaping for signals, particularly for the application in receivers for CDMA signals.

BACKGROUND OF THE INVENTION

Interferences on radio signals such as CDMA (Code Division Multiple Access) signals emitted by satellites of a GNSS (Global Navigation Satellite System) particularly occur in impulse noise environments such as in the neighborhood of vehicle ignition systems, power lines, heavy current switches or microwave ovens. The interferences occurring in these environments are usually emitted in bursts and, thus, cannot be modelled as Gaussian.

In order to reduce the effects of pulsed interferences on the reception of a radio signal, a (noise) blanker can be applied in a signal receiver. The blanker sets received signal samples to zero when they contain high power pulsed interferences. The typical blanker uses two fixed thresholds BTH+ and BTH−, which are symmetrical to zero (|BTH+|=|BTH−|). If a received signal sample contains interferences and exceeds a threshold, the sample is set to zero by the blanker. Typical receivers for CDMA signals are equipped with such a blanker.

In the absence of interference, which may be for some signal receivers a frequent situation, the blanker still operates and sets the portions of a received signal to zero, which are affected by large thermal noise samples (usually modelled as Gaussian). However, this may lead to an undesired reduction of the Signal-to-Noise and interference Ratio (SNIR).

U.S. Pat. No. 7,260,163 B2 describes a noise blanker for application with a FM signal receiver of a radio as installed in a vehicle. In order to reduce the effect of ignition noise on a received FM signal, a noise controller is provided, which uses an all-pole prediction algorithm to replace a noise-corrupted signal segment. The all-pole prediction algorithm takes a sample of a previously demodulated signal and models a new demodulated signal segment using the all-pole prediction algorithm. The algorithm uses a least mean squared (LMS) algorithm to minimize error between the received original signal and the predicted signal.

SUMMARY OF THE INVENTION

It is an object of the present invention to provide a modified blanking approach for signals, particularly CDMA signals, which may reduce the reduction of the SNIR by noise blanking.

An idea underlying the present invention consists in either offsetting blanking thresholds or a received signal by an offset value. In particular this offset value can depend on the amplitude of the received signal. For example, the amplitude of the received signal can be calculated based on the estimated power, $P_{est}$, of the received signal and its sign. Herein it is generally assumed that the amplitude of the signal can have a positive or a negative value. The offset value can be, for example, calculated by multiplying the square root of the estimated power with a predefined scaling factor, $\alpha$, which can be positive or negative: $\alpha \times \text{sqrt}(P_{est})$. It has been found by the inventors, that in case of CDMA signals, a scaling factor +1 or −1, depending on the chip value has advantageous effects, so that the offset value is $\pm\sqrt{P_{est}}$.

This invention may be advantageously applied to signals with dominant noise content, such as CDMA coded signals, for example GNSS signals. The invention can be applied to signals before or after down-conversion into a baseband, for example after down-conversion and analog to digital conversion or directly after an analog to digital conversion before a down-conversion into a baseband. The invention can be applied to any kind of signal containing a significant proportion of noise.

Generally, an offsetting can be performed with the signal amplitude, in the special case of a CDMA signal this offsetting can correspond to the chip amplitude $\pm\sqrt{P_{est}}$ with a scaling factor $\alpha=\pm 1$. The most important aspect is that the noise is dominant, i.e. is much larger than the received signal power P, and therefore to its estimate $P_{est}$. In case of received CDMA signals, at least one blanking threshold may be adapted depending on the estimated received power and the binary chip value of the received CDMA signals. The binary chip value of a CDMA signal is known by a CDMA signal receiver a priori since the spreading sequence used to code the CDMA signal is constituted of a series of chips, which has to be known by a receiver for decoding and despreading the CDMA signal. In the following, and in the particular case of a CDMA signal, the estimated chip amplitude is $\pm\sqrt{P_{est}}$ while the binary chip value is ±1.

The adaption of the at least one blanking threshold depending on the binary chip values of received CDMA signals modifies the noise distribution of the output of a blanker of a CDMA signal receiver. Instead of adapting blanking thresholds, also the samples of the CDMA signals may be adapted, for example offset; then, the adapted CDMA samples may be compared with fixed blanking thresholds, and the noise distribution of the sampled CDMA signals may be modified by applying blanking. An offsetting of the samples of CDMA signals may be performed by a value depending on the estimated chip amplitude of the CDMA signals. For example, the binary chip value scaled by the estimated amplitude of a received CDMA signal may be added to the samples of the received CDMA signal. Analytical and simulation work conducted for this invention has shown that this modification cannot only reduce the SNIR degradations caused by the blanking, but can even improve the SNIR by an optimized shaping of the noise distribution of a received CDMA signal.

Generally speaking, the invention extends from the concept of two blanking thresholds BTH+, BTH− with opposite values, as described above, to a set of N blanking thresholds BTH{i,k,n} which "cuts" regions of the distribution of samples of a received signal, and particularly a CDMA signal, at the input of a blanker to improve again the SNIR. Here, i is the index of the channel processing the $i^{th}$ signal source among I sources, k is a time index and n is a threshold index, among N thresholds. Indeed in case of CDMA signals, for each tracked CDMA signal a different chip sequence, also called replica, is used and therefore a different threshold should be applied to each time instant. The different blanking thresholds $BTH\{i,k,n\}$ do not have to be pairwise symmetrical with respect to zero for each signal i and time instant k, and their value can depend, for example in case of CDMA signal on the chip amplitude. For example, a set of scaling factors $\alpha\{i,k,n\}$, which are functions of the received signal, time and threshold index, can be multiplied with the estimated power of the $i^{th}$ signal, so that the blanking thresholds are $BTH\{i,k,n\}=\alpha\{i,k,n\}\times sqrt(P_{est,I,k})$. In this former equation $P_{est}$ depends on the received signal i and also of the time instant k.

Alternatively, it is also possible to consider a set of offset values applied to the received signal while keeping the blanking thresholds fixed. The set of offset values could depend on the signal being tracked and on the time. In that alternative implementation of the invention, the signal amplitude is varied by use of an offset value, while the blanking thresholds are kept fixed.

The main advantage of the invention is the reduction of the degradation of the SNIR of a received CDMA signal when there are no pulsed interferences, and even an improvement of the SNIR.

An embodiment of the invention relates to a method for noise distribution shaping for signals comprising the acts of generating a blanking control signal by comparing a received signal with at least one blanking threshold, adapting the at least one blanking threshold (and not modifying the received signal), or adapting the received signal (and not modifying the at least one blanking threshold) according to an offset value which depends on the amplitude of the received signal, and modifying the noise distribution of the received signal by applying blanking of the received signal under control of the blanking control signal.

The amplitude of the received signal can be calculated based on the estimated power $P_{est}$ of the received signal and the offset value can be calculated from the calculated amplitude of the received signal, particularly by multiplying the square root of the estimated power $P_{est}$ with a predefined scaling factor $\alpha$. Particularly, the predefined scaling factor $\alpha$ can be positive or negative, constant or time dependent, or the sign of the predefined scaling factor $\alpha$ can change over time as function of the received signal.

The act of adapting of the at least one blanking threshold or adapting the received signal, respectively, according to an offset value depending on the amplitude of the received signal may comprise offsetting at least one predefined blanking threshold or the received signal, respectively, with the scaled estimated amplitude of the received signal. For example, the chip amplitude scaled by a coefficient, may be added to the at least one blanking threshold without modifying the received signal or may be added to the received signal without modifying the blanking threshold.

The act of the modifying the noise distribution of the received signal by applying blanking under control of the blanking control signal may comprise setting a sample of the received signal to a predefined value depending on the blanking control signal. Particularly, samples of the received signal, which exceed the blanking thresholds, may be set to 0. A set of blanking thresholds may be used, wherein the set comprises at least one blanking threshold for each one of a plurality of received signals. This allows using different blanking thresholds for different received signals.

The received signal may be a CDMA signal, and the offset value may be calculated by multiplying the square root of the estimated power $P_{est}$ with a scaling factor being +1 or −1 depending on the chip values of the CDMA signal.

The adapting of the received signal depending on the amplitude of the received signal may be performed in the digital domain after an analog to digital conversion of the samples of the received signal.

A further embodiment of the invention relates to a computer program, which implements the method for noise distribution shaping for signals according to the invention and as described herein and enabling noise distribution shaping for signals according to the invention when executed by a computer. Such a computer program could be used by a computer equipped with a receiver comprising an antenna for receiving different signals, for example CDMA signals from satellites of a GNSS, enabling the computer to improve the SNIR of the received signals by applying the inventive noise blanking method.

According to a further embodiment of the invention, a record carrier storing a computer program according to the invention may be provided, for example a CD-ROM, a DVD, a memory card, a diskette, or a similar data carrier suitable to store the computer program for electronic access.

A yet further embodiment of the invention relates to a device for noise distribution shaping for signals comprising means for generating a blanking control signal by comparing a received signal with at least one blanking threshold, means for adapting the at least one predefined blanking threshold (and not modifying the received signal), or adapting the received signal (and not modifying the at least one blanking threshold) according to an offset value which depends on the amplitude of the received signal, and means for modifying the noise distribution of the received signal by applying blanking of the received signal under control of the blanking control signal.

The means for adapting may be further configured to calculate the amplitude of the received signal based on the estimated received power $P_{est}$ of the received signal and to calculate the offset value from the calculated amplitude of the received signal, particularly by multiplying the square root of the estimated power $P_{est}$ with a predefined scaling factor $\alpha$. Particularly, the predefined scaling factor $\alpha$ can be positive or negative, constant or time dependent, or the sign of the predefined scaling factor $\alpha$ can change over time as function of the received signal.

The means for generating a blanking control signal may comprise a comparator circuit with a first input for receiving signal samples and at least one second input for receiving the at least one blanking threshold.

The means for adapting the at least one blanking threshold or adapting the received signal, respectively, according to an offset value which depends on the amplitude of the received signal may comprise means for offsetting the at least one predefined blanking threshold or the received signal, respectively, with the scaled amplitude of the received signal.

The means for modifying the noise distribution of the received signal by applying blanking of the received signal under control of the blanking control signal may comprise means for setting a sample of the received signal to a predefined value depending on the blanking control signal. Particularly, samples of the received signal, which exceed the blanking thresholds, may be set to 0.

The device may be configured to use a set of blanking thresholds, wherein the set comprises at least one blanking threshold for each one of a plurality of received signals.

The received signal may be a CDMA signal, and the means for adapting may be configured to calculate the offset value by multiplying the square root of the estimated power $P_{est}$ with a scaling factor being +1 or −1 depending on the chip values of the CDMA signal.

A yet further embodiment of the invention relates to a GNSS receiver circuitry comprising an analog to digital converter for generating samples of received CDMA signals, a plurality of noise distribution shapers for modifying the noise distribution of the sampled CDMA signals according to the invention and as described herein, and a GNSS signal processor for processing the sampled CDMA signals output by the noise distribution shapers and for outputting chip values of the processed CDMA signals.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DESCRIPTION OF PREFERRED EMBODIMENTS

Figure 1:
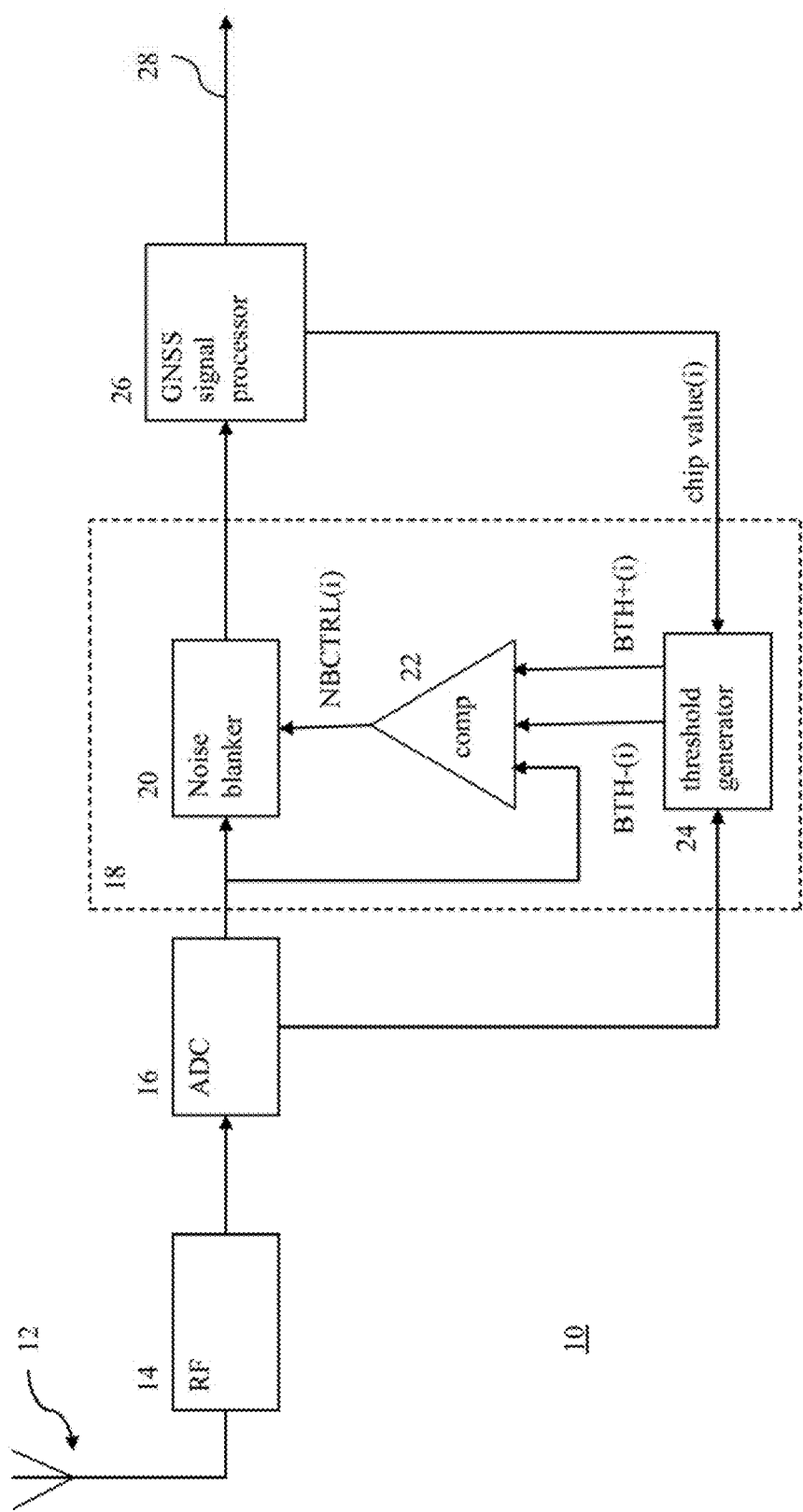
FIG. 1 shows an embodiment of a GNSS receiver circuitry with a noise distribution shaper according to the invention.

In the following, functionally similar or identical elements may have the same reference numerals. Absolute values are shown below by way of example only and should not be construed as limiting the invention. Even if the following description is applied to CDMA signals of a GNSS, it should be noted that the invention can generally be applied to any kind of signal and is, therefore, not restricted to CDMA signals.

FIG. 1 shows a block diagram of a GNSS receiver circuitry 10 comprising a noise distribution shaper according to embodiments of the invention. The shown circuitry 10 comprises a RF front end circuitry 14 for filtering and down converting CDMA signals received from GNSS signals into a baseband for further processing, an ADC (Analog to Digital Converter) 16 for sampling the down converted CDMA signals and converting the analog samples of the CDMA signals into digital values, a noise distribution shaper 18 for shaping the noise distribution of the digitized CDMA signal samples of one of the plurality of the received CDMA signals, and a GNSS signal processor 26 for correlating the received CDMA signals with spreading sequences or chip values used to encode the CDMA signals and processing the CDMA signals for determining and outputting positioning data 28. It should be noted that the noise distribution shaping can also be applied directly in RF, and is therefore not restricted to the baseband as described above.

In the following, the implementation of the noise distribution shaper 18 is described in detail. The digitized CDMA samples output by the ADC 16 are input to a blanker 20 and an input of a comparator circuit 22. The comparator circuit 22 further receives a first adaptive blanking threshold BTH−(i) and a second adaptive blanking threshold BTH+(i), which are both output from a blanking threshold generator 24. The adaptive blanking thresholds BTH−(i) and BTH+(i) are assigned to one signal (index i) of the plurality of the received I CDMA signals. In other words, each received CDMA signal usually has its own dedicated adaptive blanking thresholds. Also, less or more than two adaptive blanking thresholds may be provided. Furthermore, for each chip value taken at instant k, the blanking thresholds BTH−(i) and BTH+(i) will be modified according to this binary chip value. Now the time dependency is considered implicitly in the example to ease readability.

The blanking threshold generator 24 receives from the GNSS signal processor 26 the chip values, which are used by the processor to decode and despread the received CDMA signals. For example, if the processor 26 is able to decode four (I=4) CDMA signals among the plurality of received CDMA signals, it outputs the four chip values corresponding to the spreading sequences assigned to the four received CDMA signals and used to decode them by the processor 26. It should be noted that in such case four different adaptive blanking threshold generators 24 are required since each block will be adapted to the chip value of each sequence (in FIG. 1, only one generator block 24 is shown).

The blanking threshold generator 24 generates with the received chip values the first adaptive blanking threshold BTH−(i) and the second adaptive blanking threshold BTH+(i). The blanking thresholds BTH+(i) and BTH−(i) may be generated by offsetting predefined blanking thresholds $BTH_{pre}+$ and $BTH_{pre}-$ with the scaled amplitude of the respective CDMA signal i. The amplitude of the offset applied to the predefined blanking thresholds $BTH_{pre}+$ and $BTH_{pre}-$ is calculated based on the estimated power ($P_{est}$) of the received signal based on the samples provided by the Analog to Digital Converter (ADC), from block 16, multiplied with a scaling factor, which is a function of the binary chip value. Two scaling factors $\alpha+$ and $\alpha-$ are respectively deduced from the positive and negative chip value. The predefined blanking thresholds $BTH_{pre}+$ and $BTH_{pre}-$ may be, for example, selected depending on the environment of operation of the GNSS receiver and particularly be configured depending on the occurrence of pulsed interferences such as generated by vehicle ignition systems, power lines, heavy current switches or microwave ovens. For example, in an environment with strong pulsed interferences, such as in the neighborhood of vehicle ignition systems or power lines, the predefined blanking thresholds may be selected with a higher value than in environments with weaker pulsed interferences. For the selection of predefined blanking thresholds suitable for a certain environment, the strength and frequency of occurrence of pulsed interferences in the received CDMA signals may be determined, and depending thereon suitable predefined blanking thresholds may be determined.

The offsetting of the predefined blanking thresholds $BTH_{pre}+$ and $BTH_{pre}-$ may comprise adding the estimated received power $P_{est}$ multiplied with a positive scaling factor $\alpha_+$ for positive chip value, or adding the estimated received power $P_{est}$ multiplied with a negative scaling factor $\alpha_-$ for negative chip value:

Hence for positive chip values the adapted blanking thresholds are given by:

$$(BTH_{pre}-)+\alpha_+(i)(\text{sqrt}(P_{est})) \rightarrow BTH-(i)$$

$$(BTH_{pre}+)+\alpha_+(i)(\text{sqrt}(P_{est})) \rightarrow BTH+(i)$$

And for negative chip values the adapted blanking thresholds are given by:

$$(BTH_{pre}-)+\alpha_-(i)(\text{sqrt}(P_{est})) \rightarrow BTH-(i)$$

$$(BTH_{pre}+)+\alpha_-(i)(\text{sqrt}(P_{est})) \rightarrow BTH+(i)$$

The adaptive blanking thresholds BTH+(i) and BTH−(i) are sent to second inputs of the comparator circuit 22, which receives on its first input the digitized CDMA samples from the ADC 16. The comparator circuit 22 compares the amplitudes (algebraic values) of the digitized CDMA samples with the adaptive blanking thresholds BTH+(i) and BTH−(i) and generates, depending on the comparison, a blanking control signal NBCTRL(i), which controls the blanker 20.

The comparator circuit 22 may generate the blanking control signal NBCTRL(i) for example as follows:

amplitudes of CDMA samples of CDMA signal
    $i$>BTH+($i$)→NBCTRL($i$)=+1 amplitudes of CDMA samples of CDMA signal
    $i$<BTH−($i$)→NBCTRL($i$)=−1 amplitudes of CDMA samples of CDMA signal
    $i$<BTH+($i$) and >BTH−($i$)→NBCTRL($i$)=0

The blanker 20 sets the samples of the CDMA signals received at its input to a predefined value such as zero as long as the noise blanking control signal NBCTRL(i) is +1 or −1, and passes the received digitized CDMA signals from its input to its output if the blanking control signal NBCTRL(i) is 0.

The above example is given for two blanking thresholds BTH+ and BTH− (N=2). In the following, a brief example for the case of a larger N=4 for a CDMA signal i is given (hereby BTH(n, i) means blanking threshold n for CDMA signal i):

CDMA signal $i$ Amplitude<BTH(1,$i$)→NBCTRL($i$)=+1.

BTH(1,$i$)<CDMA signal $i$ Amplitude<BTH(2,$i$)→NBCTRL($i$)=0.

BTH(2,$i$)<CDMA signal $i$ Amplitude<BTH(3,$i$)→NBCTRL($i$)=+1.

CDMA signal $i$ Amplitude>BTH(4,$i$)→NBCTRL($i$)=+1.

Again, the proposed control low for the NBCTRL(i) based on a comparison with the 4 thresholds is just one example. The blanking control signal for the blanking thresholds BTH(n, i) is adapted for the $i^{th}$ tracked CDMA signal among I signals. As a consequence, as many blanking blocks as there are tracked signals (I) are required. Alternatively, a single control block fed with the different chip values for the I CDMA signals can be provided. However, this single control block must then be able to handle the blanking thresholds BTH(n, i) for the i CDMA signal, for example by applying multiplexing inside the block.

Figure 2:
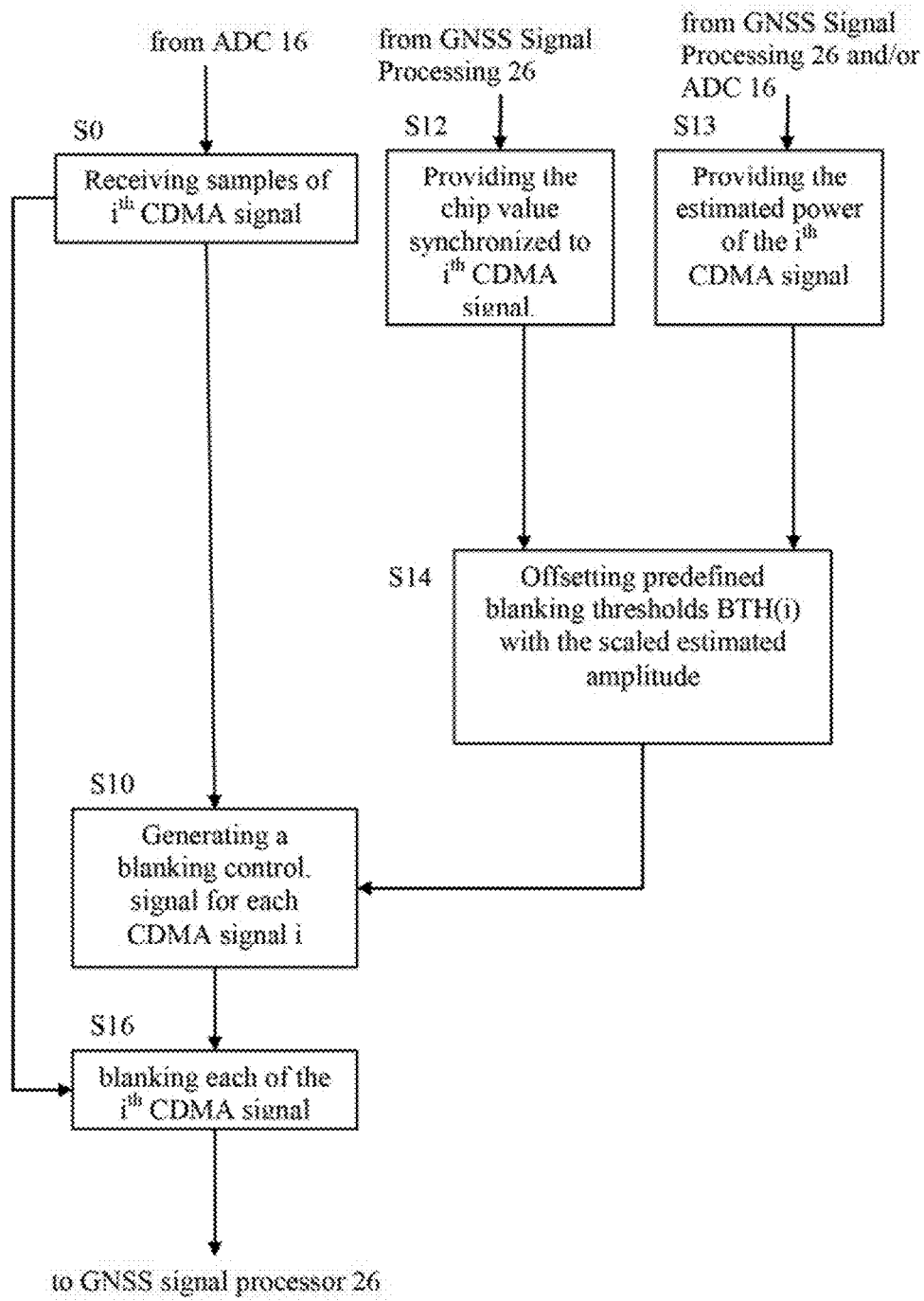
FIG. 2 shows a flow chart of an embodiment of a noise distribution shaping method for CDMA signals according to the invention.

FIG. 2 shows a flowchart of a method for noise distribution shaping for I CDMA signals according to embodiments of the invention, which can be implemented as a computer program to be executed by a processor. The method receives in step S0 digitized CDMA signal samples of the $i^{th}$ CDMA signal from the ADC 16. In step S12, the chip values of the $i^{th}$ CDMA signal are provided, which are known a priori and stored in a memory. In step S13 the $i^{th}$ CDMA signal from the ADC 16 is provided in order to estimate the power of the $i^{th}$ received CDMA signal. The scaled estimated chip amplitudes are then used in step S4 to offset predefined blanking thresholds BTH$_{pre}$(i) to generate a set of blanking thresholds BTH(i) for each CDMA signal i. With the set of blanking thresholds BTH(i) and the received digitized CDMA signal samples, the method generates, in step S10, a blanking control signal for each CDMA signal i, for example by a comparison as described above. In step S16, the noise distribution of the received samples of the $i^{th}$ CDMA signal is shaped by a blanking process controlled by the $i^{th}$ blanking control signals generated in step S10. The CDMA signal samples with shaped noise distribution are finally output to the GNSS signal processor 26 for further processing.

Figure 3:
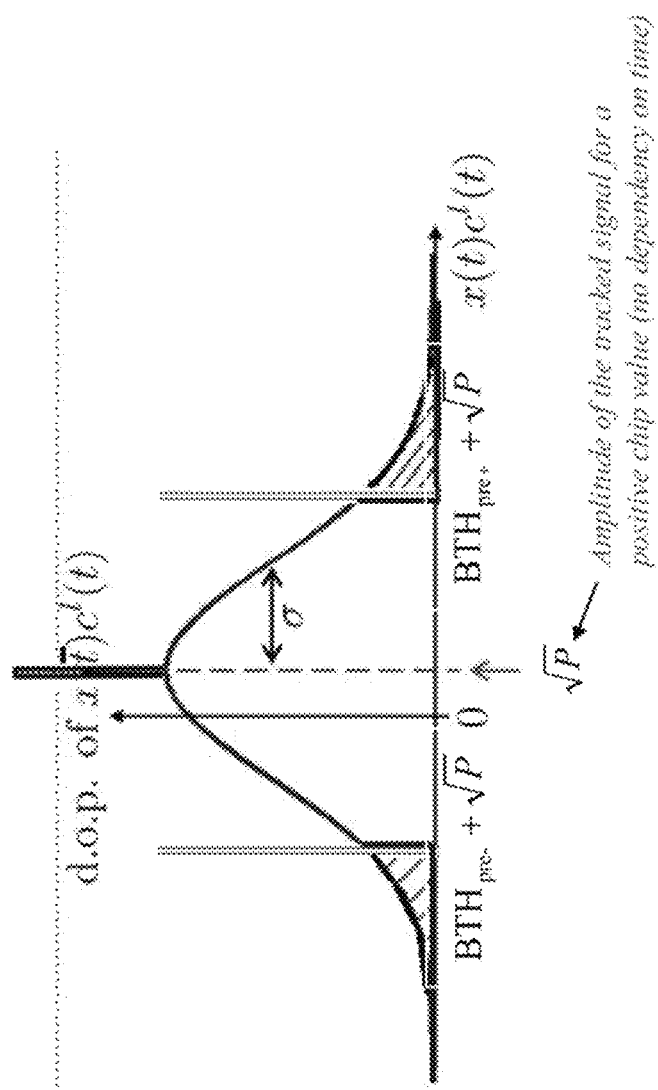
FIG. 3 shows a diagram with different adapted blanking thresholds

FIG. 3 shows a diagram with two different adapted blanking thresholds BTH$_{pre}$−+√P and BTH$_{pre}$++√P in case the chip value is positive. The blanking thresholds BTH$_{pre}$− and BTH$_{pre}$+ are adapted with the estimated power of a received CDMA signal x(t) scaled by a coefficient α (in this example α=α$_+$=1 since the chip value $c^1$(t) is positive). In the baseline situation, the coefficient shall be the square root of the estimated power multiplied with binary chip value ± √P of the received CDMA signal. Generally, this coefficient might be different, and it can even be different for the positive and negative blanking threshold as shown in FIG. 3.

The present invention allows reducing the degradation of the SNIR of a received signal, particularly a CMDA signal, when there are no pulsed interferences by offsetting the blanking thresholds or the signal depending on the amplitude of the signal, for example with the scaled amplitude (the amplitude can be positive or negative according to the chip value) of a received CDMA signal, and by comparing the amplitude (algebraic value) of samples of the received signal to the blanking thresholds.

REFERENCE NUMERALS AND ACRONYMS

10 GNSS receiver circuitry
12 antenna
14 RF front end circuitry
16 ADC
18 noise distribution shaper
20 blanker
22 comparator circuit
24 blanking threshold generator
26 GNSS signal processor
28 GNSS output data
ADC Analog to Digital Converter
BTH Blanking Threshold
CDMA Code Division Multiple Access
GNSS Global Navigation Satellite System
NBCTRL Noise Blanking Control
RF Radio Frequency The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for noise distribution shaping for signals, the method comprising the acts of:
    generating a blanking control signal by comparing a received signal with at least one blanking threshold;
    adapting the received signal by adding an offset value depending on an amplitude of the received signal; and
    modifying the noise distribution of the received signal by applying blanking of the received signal under control of the blanking control signal,
    wherein the amplitude of the received signal is calculated based on the estimated power P$_{est}$ of the received signal and the offset value is calculated from the calculated amplitude of the received signal by multiplying a square root of the estimated power $P_{est}$ with a predefined scaling factor α, wherein the predefined scaling factor α is positive or negative, constant or time dependent, or a sign of the predefined scaling factor α is changeable over time as function of the received signal.

2. The method according to claim 1, wherein the adapting of the received signal according to an offset value depending on the amplitude of the received signal comprises offsetting at least one predefined blanking threshold or the received signal, respectively, with the scaled estimated amplitude of the received signal.

3. The method according to claim 1, wherein the modifying of the noise distribution of the received signal by applying blanking under control of the blanking control signal comprises setting a sample of the received signal to a predefined value depending on the blanking control signal, wherein the predefined value is set to 0 for samples exceeding the blanking thresholds.

4. The method according to claim 1, wherein a set of blanking thresholds is used, the set comprising at least one blanking threshold for each one of a plurality of received signals.

5. The method according to claim 1, wherein the received signal is a CDMA signal, and the offset value is calculated by multiplying the square root of the estimated power $P_{est}$ with a scaling factor being +1 or −1 depending on the chip values of the CDMA signal.

6. The method according to claim 1, wherein a different blanking threshold is applied at each time instant.

7. The method according to claim 1, wherein the received signal is a signal of interest, and wherein the instantaneous amplitude of the received signal is used to determine the offset value.

8. The method according to claim 1, wherein the adapted blanking threshold is asymmetrical with respect to zero for the received signal.

9. A computer product, comprising a computer readable non-transitory medium having stored thereon program code segments that:

generate a blanking control signal by comparing a received signal with at least one blanking threshold;

adapt the received signal by adding an offset value depending on an amplitude of the received signal; and modify the noise distribution of the received signal by applying blanking of the received signal under control of the blanking control signal, wherein the amplitude of the received signal is calculated based on the estimated power $P_{est}$ of the received signal and the offset value is calculated from the calculated amplitude of the received signal by multiplying a square root of the estimated power $P_{est}$ with a predefined scaling factor α, wherein the predefined scaling factor α is positive or negative, constant or time dependent, or a sign of the predefined scaling factor α is changeable over time as function of the received signal.

10. A device for noise distribution shaping for signals, the device comprising:

a memory storing a computer program;

a processor configured to execute the computer program to:

a comparator circuit configured to generate a blanking control signal by comparing a received signal with at least one blanking threshold;

adapt the received signal by adding an offset value depending on an amplitude of the received signal; and modify the noise distribution of the received signal by applying blanking of the received signal under control of the blanking control signal, wherein the processor is further configured to execute the computer program to adapt the received signal by calculating the amplitude of the received signal based on the estimated receive power $P_{est}$ of the received signal and to calculate the offset value from the calculated amplitude of the received signal by multiplying a square root of the estimated power $P_{est}$ with a predefined scaling factor α, wherein the predefined scaling factor α is positive or negative, constant or time dependent, or a sign of the predefined scaling factor α is changeable over time as function of the received signal.

11. The device according to claim 10, wherein the comparator circuit comprises a first input for receiving signal samples and at least one second input for receiving the at least one blanking threshold.

12. The device according to claim 10, wherein the processor is further configured to execute the computer program to adapt the received signal according to an offset value depending on the amplitude of the received signal by offsetting at least one predefined blanking threshold or the received signal, respectively, with the scaled estimated amplitude of the received signal.

13. The device according to claim 10, wherein the processor is further configured to execute the computer program to modify the noise distribution of the received signal by setting a sample of the received signal to a predefined value depending on the blanking control signal, wherein the predefined value is set to 0 for samples exceeding the blanking thresholds.

14. The device according to claim 10, wherein the device is configured to use a set of blanking thresholds, wherein the set comprises at least one blanking threshold for each one of a plurality of received signals.

15. The device according to claim 10, wherein the received signal is a CDMA signal, and the means for adapting are configured to calculate the offset value by multiplying the square root of the estimated power $P_{est}$ with a scaling factor being +1 or −1 depending on the chip values of the CDMA signal.

16. A Global Navigation Satellite System (GNSS) receiver circuitry, comprising;

receiving circuitry configured to received Code Division Multiple Access (CDMA) signals;

an analog to digital converter for generating samples of the received CDMA signals;

a plurality of noise distribution hardware shapers for modifying the noise distribution of the sampled CDMA signals, wherein the modifying of the noise distribution of the sampled CDMA signals is carried out by adapting the received CDMA signals by adding an offset value depending on an amplitude of the respectively received CDMA signals; and a signal processor configured to process the sampled CDMA signals output by the noise distribution shapers and to output chip values of the received CDMA signals, wherein the offset value is calculated by multiplying a square root of an estimated power $P_{est}$ with a scaling factor being +1 or −1 depending on the chip values of the received CDMA signals.

\* \* \* \* \*